United States Patent
Maier et al.

(10) Patent No.: US 10,060,474 B2
(45) Date of Patent: Aug. 28, 2018

(54) MAGNETIC BEARING PROTECTION DEVICE

(71) Applicants: DRESSER-RAND COMPANY, Olean, NY (US); William C. Maier, Almond, NY (US); Joseph A. Tecza, Scio, NY (US)

(72) Inventors: William C. Maier, Almond, NY (US); Joseph A. Tecza, Scio, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 342 days.

(21) Appl. No.: 14/786,593

(22) PCT Filed: May 6, 2014

(86) PCT No.: PCT/US2014/036883
§ 371 (c)(1),
(2) Date: Oct. 23, 2015

(87) PCT Pub. No.: WO2014/182646
PCT Pub. Date: Nov. 13, 2014

(65) Prior Publication Data
US 2016/0084304 A1    Mar. 24, 2016

Related U.S. Application Data

(60) Provisional application No. 61/821,300, filed on May 9, 2013.

(51) Int. Cl.
*H02K 7/09* (2006.01)
*F16C 32/04* (2006.01)
*F16C 35/00* (2006.01)

(52) U.S. Cl.
CPC .......... *F16C 32/047* (2013.01); *F16C 32/048* (2013.01); *F16C 35/00* (2013.01)

(58) Field of Classification Search
CPC .... F16C 35/00; F16C 32/048; F16C 32/0406; H02K 7/09
See application file for complete search history.

(56) References Cited

U.S. PATENT DOCUMENTS 5,973,430 A * 10/1999 Brunet ............... B23Q 1/70
                                                    310/90.5
7,629,715 B1 * 12/2009 Sortore ............... H02K 9/19
                                                    310/52

(Continued)

FOREIGN PATENT DOCUMENTS

| EP | 1967286 A2 | 9/2008 |
|---|---|---|
| JP | H11-125249 A | 5/1999 |
| JP | 2010211870 A | 9/2010 |

*Primary Examiner* — Forrest M Phillips (57) ABSTRACT

A radial magnetic bearing may include an annular housing including a radial outer wall disposed between radially outer ends of two annular axial end plates and an isolation sleeve which may include a helical arrangement of a plurality of ferromagnetic wires. The isolation sleeve may be an annular structure extending axially between the two annular axial end plates, and the isolation sleeve and the annular housing may define an isolation cavity therebetween. The radial magnetic bearing may also include an isolation sleeve retainer configured to maintain a position of the isolation sleeve between the two annular axial end plates. The radial magnetic bearing may further include a plurality of laminations disposed adjacent the isolation sleeve and about a shaft of the rotating machine. A gap may be defined between the plurality of laminations and the isolation sleeve.

20 Claims, 5 Drawing Sheets

(56) References Cited

U.S. PATENT DOCUMENTS

| | | | |
|---|---|---|---|
| 8,465,207 B2* | 6/2013 | Maier | F16C 32/0442 |
| | | | 384/465 |
| 8,513,826 B2* | 8/2013 | Mazur | F03D 3/0418 |
| | | | 290/44 |
| 9,228,588 B2* | 1/2016 | Maier | F04D 3/00 |
| 9,777,746 B2* | 10/2017 | Maier | F04D 29/5806 |
| 2003/0234586 A1* | 12/2003 | Iwase | H02K 1/06 |
| | | | 310/49.32 |
| 2006/0163962 A1* | 7/2006 | Shimada | B23Q 1/70 |
| | | | 310/90.5 |
| 2007/0200443 A1 | 8/2007 | Baudelocque et al. | |
| 2007/0273230 A1* | 11/2007 | Foshage | H01F 7/06 |
| | | | 310/90.5 |
| 2008/0138202 A1* | 6/2008 | Eilers | F04D 19/042 |
| | | | 415/229 |
| 2009/0009017 A1* | 1/2009 | Miyagawa | F04D 29/051 |
| | | | 310/90.5 |
| 2009/0127956 A1* | 5/2009 | Ozaki | F01D 15/005 |
| | | | 310/90.5 |
| 2009/0179515 A1* | 7/2009 | Chu | H02K 3/14 |
| | | | 310/195 |
| 2010/0194224 A1* | 8/2010 | Smithanik | F16C 32/0461 |
| | | | 310/90.5 |
| 2011/0001377 A1 | 1/2011 | Baudelocque et al. | |
| 2011/0001379 A1* | 1/2011 | McCarthy | F16C 19/10 |
| | | | 310/90.5 |
| 2011/0044832 A1* | 2/2011 | Nijhuis | F04D 15/02 |
| | | | 417/423.12 |
| 2011/0085752 A1* | 4/2011 | Tecza | F16C 32/0442 |
| | | | 384/295 |
| 2011/0085754 A1* | 4/2011 | Maier | F16C 32/0442 |
| | | | 384/470 |
| 2011/0089780 A1* | 4/2011 | Schwarz | F16C 32/0438 |
| | | | 310/90.5 |
| 2011/0234033 A1* | 9/2011 | Filatov | F16C 32/0485 |
| | | | 310/90.5 |
| 2011/0309702 A1* | 12/2011 | Miller | F16C 32/0448 |
| | | | 310/90.5 |
| 2012/0286606 A1 | 11/2012 | Moulin et al. | |
| 2013/0038157 A1* | 2/2013 | Choi | F16C 32/047 |
| | | | 310/90.5 |
| 2013/0099612 A1 | 4/2013 | Baudelocque et al. | |
| 2013/0181799 A1* | 7/2013 | Deville | E21B 17/028 |
| | | | 336/90 |
| 2013/0257206 A1* | 10/2013 | Lee | B23Q 1/70 |
| | | | 310/90.5 |
| 2014/0321785 A1* | 10/2014 | Maier | F16C 35/077 |
| | | | 384/456 |
| 2015/0362012 A1* | 12/2015 | Ermilov | F16C 17/024 |
| | | | 384/105 |
| 2016/0102704 A1* | 4/2016 | Post | F16C 32/0404 |
| | | | 310/90.5 |
| 2016/0108967 A1* | 4/2016 | Massini | F16C 37/005 |
| | | | 310/90.5 |

* cited by examiner

MAGNETIC BEARING PROTECTION DEVICE

CROSS-REFERENCE TO RELATED APPLICATIONS

The present application is a national stage application of PCT Pat. App. No. PCT/US2014/036883, filed May 6, 2014, which claims priority to U.S. Provisional Patent Application having Ser. No. 61/821,300, which was filed May 9, 2013. These priority applications are hereby incorporated by reference in their entirety into the present application, to the extent that they are not inconsistent with the present application.

BACKGROUND

Active magnetic bearings (AMBs) have recently emerged as an attractive technology for controlling the position of a wide range of rotating machinery shafts, particularly for turbomachinery rotors. Reliable and efficient compression systems have been developed and are used in a myriad of industrial process (for example, petroleum refineries, offshore oil production platforms, etc). There is, however, an ever-increasing demand for smaller, lighter, and more compact compression systems.

Figure 1:
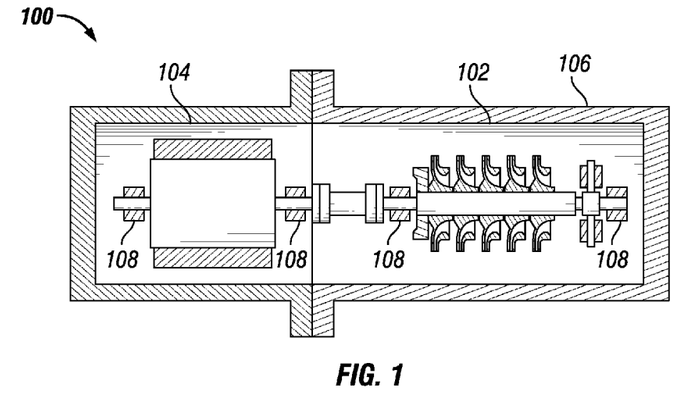
FIG. 1 illustrates a cross-sectional view of a conventional compact compressor utilizing active magnetic bearings.

Compact compressors (also referred to as compact motor-compressors) combine a pressurized, high-speed motor and magnetic bearing system with the compressor in a single, hermetically sealed motor-compressor module. FIG. 1 illustrates a cross-sectional view of a conventional compact compressor 100. The conventional compact compressor 100 has a compressor end 102 and motor end 104. A pressure casing 106 hermetically seals the compressor and the motor. As is illustrated in FIG. 1, active magnetic bearings (AMBs) 108 are used at various locations along the shaft of the compact compressor 100. For example, AMBs may be typically located at the ends of the shaft and, depending on a length of the shaft, at one or more locations between the ends of the shaft.

One drawback is that the AMBs 108 are inside the pressure casing 106 and thus potentially exposed to harmful contaminants in the process stream including liquids, sediments, acids, and/or other aggressive chemical agents. In order to protect the AMBs 108, a housing may be provided around the AMBs 108 to create an isolated environment for the AMBs 108. Such an enclosed bearing is generally known as a "canned" bearing. The housing of a canned bearing also serves to protect the magnetic bearing from damaging external pressures. Conventional cans are often made of a non-magnetic metal. As a result, the magnetic coupling between the stator and the rotor is reduced. Further, using metallic cans may result in eddy current generation in the metallic cans at the interface of the shaft and the stator.

What is needed, then, is a bearing isolation system that isolates the AMBs from the harmful contaminants, maximizes magnetic coupling between the rotor and the stator, and limits deleterious eddy currents generation at the interface of the rotor and the stator.

SUMMARY

Example embodiments of the disclosure may provide a radial magnetic bearing of a rotating machine. The radial magnetic bearing may include an annular housing having a radial outer wall disposed between radially outer ends of two annular axial end plates and an isolation sleeve having a helical arrangement of a plurality of ferromagnetic wires. The isolation sleeve may be an annular structure extending axially between the two annular axial end plates, and the isolation sleeve and the annular housing may define an isolation cavity therebetween. The radial magnetic bearing may also include an isolation sleeve retainer disposed at radially inner ends of the two annular axial end plates. The isolation sleeve retainer may be configured to maintain a position of the isolation sleeve between the two annular axial end plates. The radial magnetic bearing may further include a plurality of laminations disposed adjacent the isolation sleeve and about a shaft of the rotating machine. A gap may be defined between the plurality of laminations and the isolation sleeve.

Example embodiments of the disclosure may provide another radial magnetic bearing for a rotating machine. The radial magnetic bearing may include an annular housing having a radial outer wall disposed between radially outer ends of two annular axial end plates. Each of the two annular axial end plates may define a central opening for a shaft of the rotating machine to extend therethrough. The radial magnetic bearing may also include an annular isolation sleeve extending axially between the respective central openings of the two annular axial end plates. The annular isolation sleeve may include ferromagnetic powder and a plurality of non-magnetic wires helically arranged in the annular isolation sleeve. The radial magnetic bearing may further include at least two transfer tubes configured to provide fluid communication between the annular housing and respective flanges located on an external surface of the rotating machine.

Example embodiments of the disclosure may provide an isolation sleeve of a canned radial magnetic bearing. The isolation sleeve may be disposed between a stator portion of the canned radial magnetic bearing and a rotor supported by the canned radial magnetic bearing. The isolation sleeve may include a helical arrangement of a plurality of ferromagnetic wires and a plurality of non-magnetic wires. The plurality of ferromagnetic wires and the plurality of non-magnetic wires may be embedded in one of a thermoplastic, a thermosetting plastic, and a ceramic. The plurality of ferromagnetic wires and the plurality of non-magnetic wires may be arranged in a plurality of radially extending layers.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
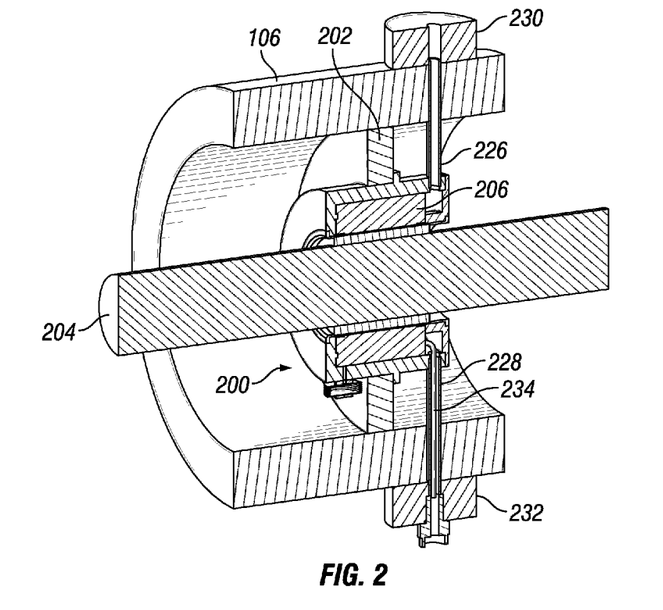
FIG. 2 illustrates a cross-sectional perspective view of an active exemplary magnetic bearing, according to one or more embodiments disclosed.
Figure 3:
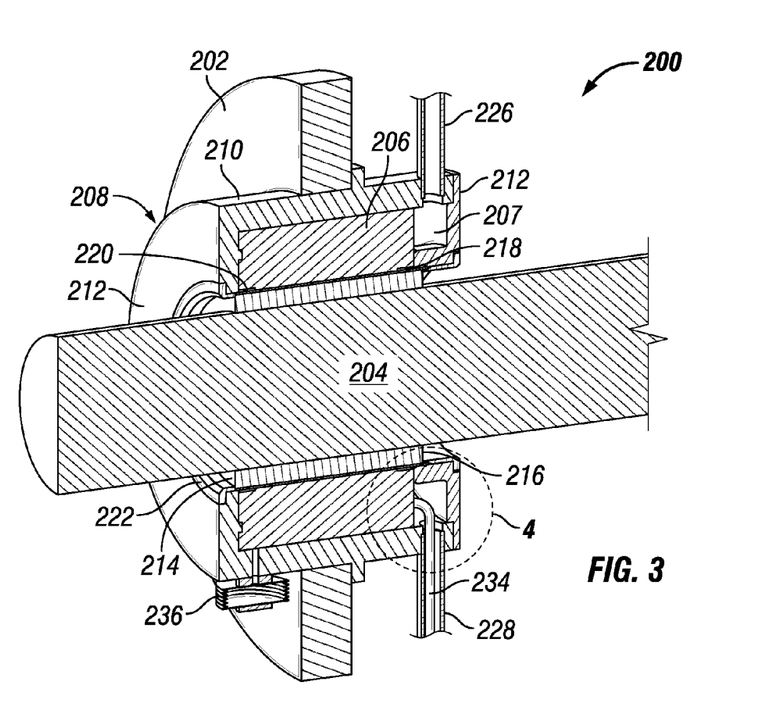
FIG. 3 illustrates a detailed cross-sectional perspective view of the active magnetic bearing of FIG. 2.

FIG. 2 illustrates a cross-sectional perspective view of an exemplary active magnetic bearing (AMB) 200, according to one or more embodiments disclosed. The AMB 200 may, for example, be a radial magnetic bearing that may be enclosed in the pressure casing 106 of the compact compressor 100 of FIG. 1. The AMB 200 may be supported by mounting brackets 202 that connect the AMB 200 to the inner radial surface of the compact compressor 100. The AMB 200 may support a shaft 204 of the compact compressor 100. FIG. 3 illustrates a detailed cross-sectional perspective view of the active magnetic bearing 200 of FIG. 2.

Referring to FIGS. 2 and 3, a stator portion 206 of the AMB 200 may be housed in a housing 208 that may provide an isolated environment for some or all of the components of the stator portion 206 including, for example, bearing stators, windings, laminations, and/or interconnecting cabling/wires. The housing 208 may be a generally hollow structure having a generally annular shape and may include a radial outer wall 210, the axial ends of which are connected to radially outer ends of two annular axial plates 212 at the respective axial ends of the housing 208. Each of the two annular axial plates 212 may define a central opening 214 for the shaft 204 to extend therethrough. The stator portion 206 may be disposed about the shaft 204 in the housing 208.

As illustrated in FIG. 3, a plurality of rotor laminations 216 may be disposed between the shaft 204 and the stator portion 206. In an example embodiment, the plurality of rotor laminations 216 may not extend beyond the two annular axial plates 212. A gap 218 may be present between the outer circumferential surface of the plurality of rotor laminations 216 and the inner circumferential surface of the stator portion 206. The gap 218 may permit relative motion of the shaft 204 in the housing 208 (or alternatively, in the stator portion 206). The magnetic fields produced in the stator portion 206 may traverse the gap 218 to provide the required levitation forces on the shaft 204. The gap 218 may be about 0.5 mm to about 1.00 mm thick and may be formed by, for example, adjusting the inner diameter of the stator portion 206 and/or the outer diameter of the plurality of rotor laminations 216.

An isolation sleeve 220 may be disposed in the gap 218 between the plurality of rotor laminations 216 and the stator portion 206. The isolation sleeve 220 may be disposed closer to the stator portion 206 than the plurality of rotor laminations 216. In an example embodiment, the isolation sleeve 220 may be connected to the housing 208 using bolts, glue, O-rings, or any other conventional techniques. In conventional active magnetic bearings, a thin metallic sheath or can (of about 0.2 mm to 1.0 mm in thickness) is used instead of the isolation sleeve 220. In such cases, the can may be made from a non-magnetic metal such as Monel®, Inconel®, or non-magnetic stainless steels. In an exemplary embodiment, the isolation sleeve 220 may be retained in the gap 218 using isolation sleeve retainers 222 located at or adjacent the radially inner ends of the two annular axial plates 212. The interface between the isolation sleeve 220 and the isolation sleeve retainers 222 may be sealed using O-rings 224, as illustrated in FIG. 4.

Figure 4:
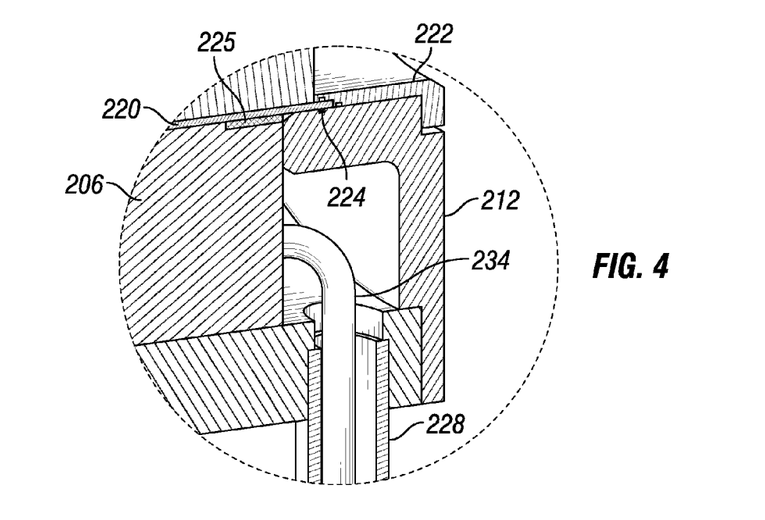
FIG. 4 illustrates a detailed cross-sectional view of an inner radial region of the active magnetic bearing, as shown encircled in FIG. 3.

FIG. 4 illustrates a detailed cross-sectional view of an inner radial region of the stator portion 206 of the AMB 200, as shown encircled in FIG. 3. Also illustrated in FIG. 4 is a typical location of one or more sensors 225 within the housing 208. As known in the art, the sensors 225 may be configured to detect the general position of the shaft 204 and send corresponding signals to a controller to maintain the shaft 204 centrally positioned within the AMB 200.

In an example embodiment, an isolation cavity 207 (FIG. 3) defined by the housing 208 and the isolation sleeve 220 may be filled with a suitable fluid such as a fluorinated hydrocarbon or silicone-based transformer fluid that provides the required stability, heat transfer, inflammability, and/or chemical compatibility with the various AMB 200 components. The housing 208 may be made from any suitable metal, such as stainless steel. One or both the annular axial plates 212 may be removable and, as such, may facilitate insertion of the stator portion 206. When removable, the annular axial plates 212 may be sealed with an O-ring seal and axially bolted to the radial outer wall 210.

As illustrated in FIGS. 2 and 3, transfer tubes 226, 228 may extend from the housing 208 to the pressure casing 106.

As shown in FIGS. 2 and 3, the transfer tubes 226, 228 may create a sealed passage projecting radially outward from the housing 208 to the outer surface of the pressure casing 106. The ends of the transfer tubes 226, 228 may be sealingly engaged with the housing 208 and with respective interfacing flanges 230, 232 located on an outer surface of the pressure casing 106. For example, the transfer tube ends may be sealed using radially oriented, elastomeric O-ring seals and appropriately sized grooves in the transfer tubes. Although, only two transfer tubes 226, 228 are illustrated, it will be apparent that any number of transfer tubes may be included. The transfer tubes 226, 228 may be located at or adjacent the axial ends of the housing 208 or at any location therebetween.

One or both the transfer tubes 226, 228 may contain interconnection cables/wires therein. FIGS. 2 and 3 illustrate the transfer tube 228 containing interconnection cables 234 which may be accessed by the interfacing flange 232. The interconnection cables 234 typically include power and/or sensing wires. Prior art solutions typically have separate isolation schemes for the wires and the stator portion that can lead to extra cost and possible isolation failure at the interface between the stator portion and the wires.

To facilitate filling and bleeding of the housing 208, the transfer tube 228 including the interconnection cables 234 may be located in the lower portion of compact compressor 100 relative to the compressor centerline and the fill/bleed transfer tube 226 may be positioned at an upper vertical position. The transfer tubes 226, 228 may be installed after the compact compressor 100 is assembled and the AMB 200 is assembled therein. In an example embodiment, the interconnecting cables may first be pulled through the respective transfer tube(s) in the pressure casing 106 and the transfer tube(s) may then be slid over the interconnecting cables and sealed in position. The interconnection cables may then be attached to connectors fixed to the respective interfacing flange(s) and the interfacing flange(s) may then be fastened on the pressure casing 106. To ensure proper functioning of the housing and the transfer tubes, the isolation cavity defined by the housing may be evacuated with a vacuum pump and the fluid de-gassed prior to filling the fluid through the fill transfer tube. After doing so, the interfacing flange 230 of the fill transfer tube 226 may be attached.

The pressure in the housing 208 may be regulated by one or more pressure regulators, such as the pressure regulator 236. The pressure regulator 236 may be fluidly coupled to the housing 208. In an example embodiment, the pressure regulator 236 may be an equalizing bellows (for example, a welded metallic bellows) or other similar pressure regulating device. Because of a pre-defined amount of stiffness in the pressure regulator 236, the pressure in the housing 208 may be slightly lower than the pressure outside the housing 208, for example, the pressure in the compact compressor 100. This pressure difference, which, for example, may range from 1 to 2 bar, may keep the isolation sleeve 220 positioned firmly against the stator portion 206 and away from the shaft 204, the plurality of rotor laminations 216 and/or other rotor assembly. As a result, the gap 218 may be maintained between the isolation sleeve 220 and the plurality of rotor laminations 216. The structure of the isolation sleeve 220 will now be described with reference to the various views of the isolation sleeve 220 illustrated in FIGS. 5A, 5B, and 5C.

Figure 5A:
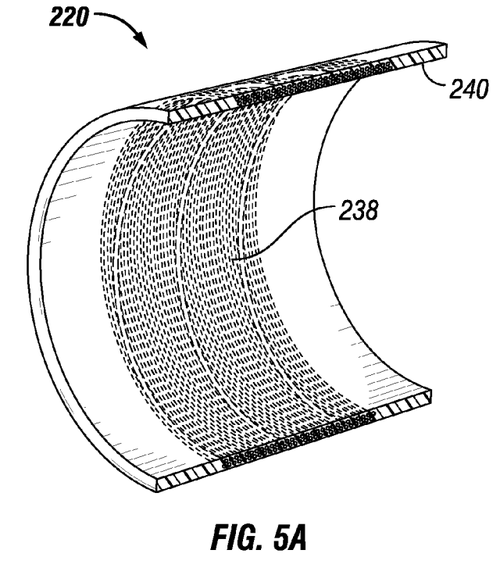
FIGS. 5A, 5B, and 5C illustrate various views of an exemplary isolation sleeve, according to one or more embodiments disclosed.
Figure 5B:
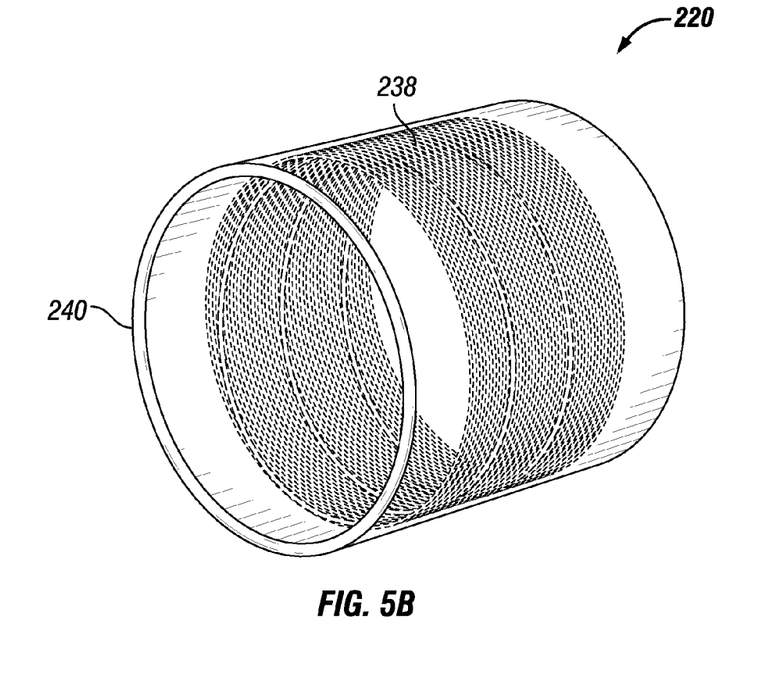
Figure 5C:
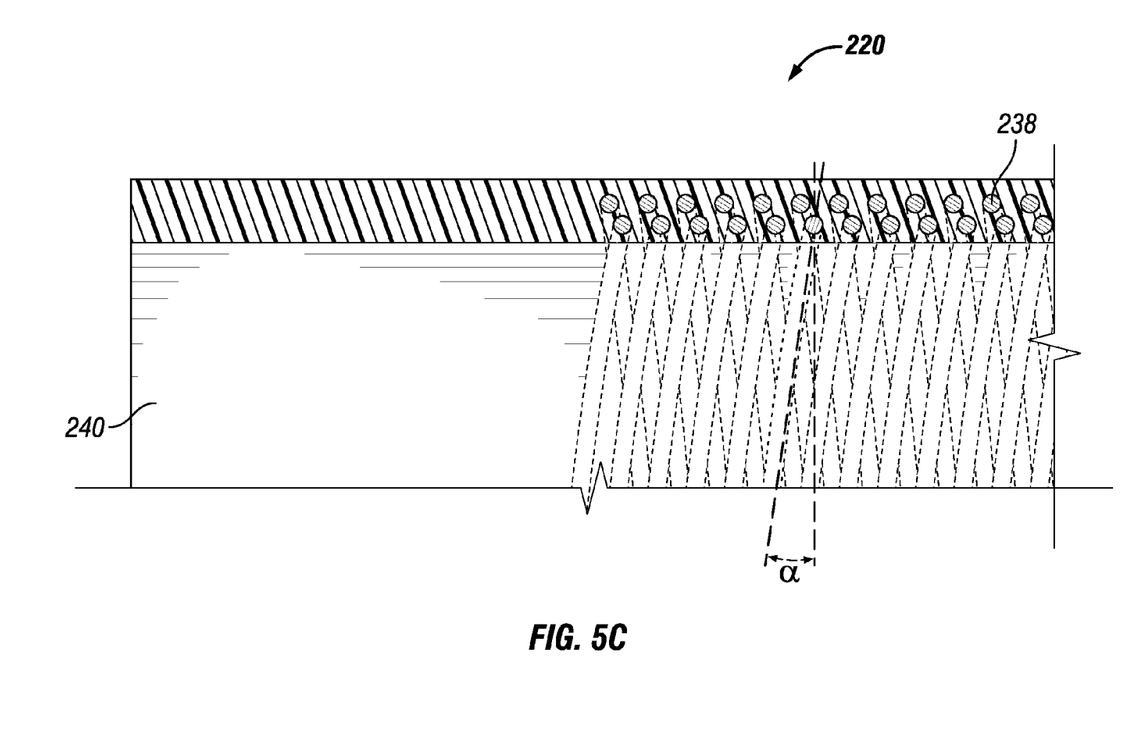

FIG. 5A is a cross-sectional perspective view of the isolation sleeve 220, according to one or more exemplary embodiments disclosed. FIG. 5B is a perspective view of the isolation sleeve 220, according to one or more exemplary embodiments disclosed. FIG. 5C is a partial cross-sectional view of the isolation sleeve 220, according to one or more exemplary embodiments disclosed.

The isolation sleeve 220 may be composed of thin wires 238, for example, of a ferromagnetic material, helically wound and embedded in a thin, annular plastic body 240. Such a structure may maximize magnetic coupling between the stator portion 206 and the shaft 204 and, at the same time, may minimize the amount of deleterious eddy currents generated in the isolation sleeve 220.

The helical arrangement of the wires 238 may form a matrix. The isolation sleeve 220 may be injection molded with thermoplastic, thermosetting plastic, or a ceramic that may provide the appropriate mechanical strength, stator isolation, and/or chemical compatibility with the process fluids. Examples of thermoplastics may include, but are not limited to, polyetherketone (PEK), polyetheretherketone (PEEK), polyphenylene sulphide (PPS), or the like. Examples of thermosetting plastics may include, but are not limited to, epoxy, polyesters, or the like.

FIG. 5C illustrates only two radial layers of wires 238 for the sake of clarity. As will be understood, a plurality of radial layers of the wires 238 may be included in the isolation sleeve 220. The diameter of each wire may be from about 0.05 mm to about 0.09 mm and a thickness of the isolation sleeve 220 may be from about 0.2 to about 1.0 mm. The separation between wires 238 may minimize wire to wire electrical insulation.

The wires 238 may be of a ferromagnetic material, such as cobalt, silicon steel or the like. In an example embodiment, the wires 238 may be pre-coated with a thin layer of insulation to minimize wire to wire electrical leakage. This, in combination with the generally circumferential orientation of the wires 238, may minimize induced eddy current losses in the isolation sleeve 220 that are inherent in prior art canned magnetic bearing configurations. A single wire is differentiated in FIGS. 5A and 5B to illustrate the generally helical orientation of the wires 238. The helix angle α, illustrated in FIG. 5C, between a wire 238 and a plane perpendicular to central axis of the isolation sleeve 220 (for example, referred to as a radial plane) may vary between about 10 degrees and about 60 degrees in order to optimize structural strength of the isolation sleeve 220. A suitable tension may be applied to the wires 238 during the winding process to optimize the structural properties of the isolation sleeve 220.

In an example embodiment, the wires 238 at least in a portion of the isolation sleeve 220 adjacent the sensors 225 (FIG. 4) may be of a non-magnetic material in order to minimize any interference a magnetic material may cause with the operation of the sensors 225. Example non-magnetic materials include carbon, glass, boron fibers, or the like. The diameter of each non-magnetic wire may be from about 0.05 mm to about 0.09 mm.

Figure 6:
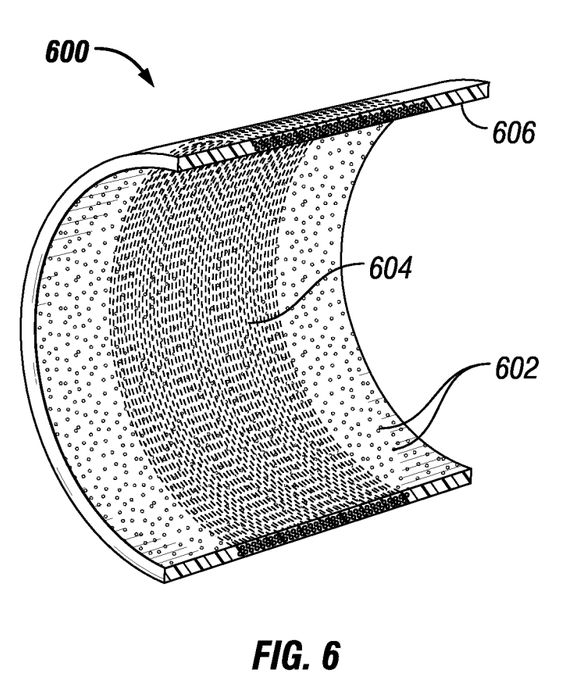
FIG. 6 illustrates a cross-sectional view of another exemplary isolation sleeve, according to one or more embodiments disclosed.

FIG. 6 illustrates a cross-sectional view of another exemplary isolation sleeve 600, according to one or more embodiments disclosed. The isolation sleeve 600 may include a thin, annular plastic body 606 including ferromagnetic powder 602 instead of ferromagnetic wires. In order to maintain the structural strength of the isolation sleeve 600, the isolation sleeve 600 may include a plurality of non-magnetic wires 604 helically wound in the isolation sleeve 600. Although illustrated only in a portion of the isolation sleeve 600, the plurality of non-magnetic wires 604 may be present throughout the isolation sleeve 600. For example, the plurality of non-magnetic wires 604 may include non-magnetic materials such as carbon, glass, boron fibers, or the like. The ferromagnetic powder 602 may be coated with an electrically insulating material that may provide insulation between individual particles of the ferromagnetic powder 602. The isolation sleeve 600 including the ferromagnetic powder 602 may provide magnetic coupling between the stator portion 206 and the shaft 204, and/or minimize eddy current generation. The plurality of non-magnetic wires 604 may also be arranged in a plurality of radially extending layers. In an example embodiment, a portion of the isolation sleeve 600 adjacent the sensors 225 may not include the ferromagnetic powder 602. As a result, any potential interference the ferromagnetic powder 602 may cause with the operation of the sensors 225 may be minimized.

Although not illustrated, the housing and the transfer tubes, according to example embodiments disclosed above, may also be used to isolate/protect the stator portion of an axial thrust bearing of the compact compressor and the interconnection cabling thereof. Herein, the isolation sleeve may be in the form of a relatively flat, thin, disc placed between the stator portion and the shaft mounted annular thrust disk.

Example embodiments disclosed above allow for the protection of the stator components and accompanying wiring. This may allow for the use of standard electrical components because the electrical components would be operating in an isolated environment created by the housing and the isolation sleeve disclosed above.

In addition, an active magnetic bearing using an isolation sleeve, according to example embodiments disclosed above, may have a relatively higher load carrying capacity than a prior art active magnetic bearing that uses non-magnetic cans. This is because the isolation sleeve permits a relatively higher amount of magnetic flux to transmit therethrough resulting in a relatively higher load carrying capacity. Prior art active magnetic bearings using non-magnetic cans effectively increase the gap between the stator portion of the bearing and rotor causing a reduced magnetic flux to be transmitted to the rotor.

The isolation sleeve, according to example embodiments disclosed above, results in fairly negligible induced eddy current losses in the isolation sleeve as compared to the substantial losses incurred in typical prior art metallic can protection systems. This translates into more load carrying capacity as well as less demand for bearing cooling. The transfer tubes facilitate the creation of a hermetically isolated volume around the active magnetic bearing components because the transfer tubes can be installed after assembling all of the major components into the pressure casing.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A radial magnetic bearing of a rotating machine, comprising:
an annular housing including a radial outer wall disposed between radially outer ends of two annular axial end plates;
an isolation sleeve including a helical arrangement of a plurality of ferromagnetic wires, the isolation sleeve being an annular structure extending axially between the two annular axial end plates, and the isolation sleeve and the annular housing defining an isolation cavity therebetween;
an isolation sleeve retainer disposed at radially inner ends of the two annular axial end plates, the isolation sleeve retainer configured to maintain a position of the isolation sleeve between the two annular axial end plates; and
a plurality of laminations disposed adjacent the isolation sleeve and about a shaft of the rotating machine, a gap being defined between the plurality of laminations and the isolation sleeve.

2. The radial magnetic bearing of claim 1, further comprising at least two transfer tubes configured to provide fluid communication between the isolation cavity and respective interfacing flanges externally located on the rotating machine.

3. The radial magnetic bearing of claim 2, further comprising wiring extending from the annular housing to the respective interfacing flange via one or more of the at least two transfer tubes, the wiring being immersed in a fluid.

4. The radial magnetic bearing of claim 2, wherein the at least two transfer tubes are located at or adjacent an axial end of the annular housing.

5. The radial magnetic bearing of claim 1, wherein at least one of the two annular axial end plates is removable.

6. The radial magnetic bearing of claim 1, further comprising a pressure regulator configured to regulate pressure inside a cavity defined by the annular housing.

7. The radial magnetic bearing of claim 6, wherein the pressure regulator is an equalizing bellows.

8. The radial magnetic bearing of claim 1, wherein the isolation sleeve includes one of a thermoplastic, a thermosetting plastic, and a ceramic, and the plurality of ferromagnetic wires are embedded in the isolation sleeve.

9. The radial magnetic bearing of claim 1, wherein the plurality of ferromagnetic wires are arranged in a plurality of radially extending layers, and each wire of the plurality of ferromagnetic wires is coated with an insulating material.

10. The radial magnetic bearing of claim 1, wherein a thickness of the isolation sleeve is from about 0.2 mm to about 1.0 mm and each ferromagnetic wire of the plurality of ferromagnetic wires has a diameter from about 0.05 mm to about 0.09 mm.

11. The radial magnetic bearing of claim 1, wherein the isolation sleeve further comprises a plurality of non-magnetic wires at least in a portion of the isolation sleeve adjacent at least one sensor disposed in the annular housing.

12. A radial magnetic bearing for a rotating machine, comprising:
an annular housing having a radial outer wall disposed between radially outer ends of two annular axial end plates, each of the two annular axial end plates defining a central opening for a shaft of the rotating machine to extend therethrough;
an annular isolation sleeve extending axially between the respective central openings of the two annular axial end plates, the annular isolation sleeve comprising ferromagnetic powder and a plurality of non-magnetic wires helically arranged in the annular isolation sleeve; and
at least two transfer tubes configured to provide fluid communication between the annular housing and respective flanges located on an external surface of the rotating machine.

13. The radial magnetic bearing of claim 12, wherein the ferromagnetic powder is coated with an insulating material providing insulation between individual particles of the ferromagnetic powder.

14. The radial magnetic bearing of claim 12, wherein at least one shaft position sensor is located in the annular housing adjacent the shaft, and at least a portion of the annular isolation sleeve adjacent the at least one shaft position sensor does not include the ferromagnetic powder.

15. The radial magnetic bearing of claim 12, wherein the annular isolation sleeve and the radial outer wall define an isolation cavity therebetween, a stator portion of the radial magnetic bearing being disposed in the isolation cavity.

16. The radial magnetic bearing of claim 15, further comprising at least one pressure regulator configured to maintain a difference in pressure inside the isolation cavity and pressure outside the isolation cavity, such that the annular isolation sleeve is positioned against the stator portion of the radial magnetic bearing.

17. The radial magnetic bearing of claim 12, further comprising a plurality of laminations wound on the shaft adjacent the annular isolation sleeve, a gap being defined between the plurality of laminations and the annular isolation sleeve.

18. An isolation sleeve of a canned radial magnetic bearing, the isolation sleeve being disposed between a stator portion of the canned radial magnetic bearing and a rotor supported by the canned radial magnetic bearing, the isolation sleeve comprising:
a helical arrangement of a plurality of ferromagnetic wires and a plurality of non-magnetic wires, the plurality of ferromagnetic wires and the plurality of non-magnetic wires being embedded in one of a thermoplastic, a thermosetting plastic, and a ceramic, and the plurality of ferromagnetic wires and the plurality of non-magnetic wires being arranged in a plurality of radially extending layers.

19. The isolation sleeve of claim 18, wherein the plurality of non-magnetic wires are disposed at least in a portion of the isolation sleeve adjacent at least one sensor of the canned radial magnetic bearing.

20. The isolation sleeve of claim 18, wherein a thickness of the isolation sleeve is from about 0.2 mm to about 1.0 mm and each ferromagnetic wire of the plurality of ferromagnetic wires and each non-magnetic wire of the plurality of non-magnetic wires has a diameter from about 0.05 mm to about 0.09 mm.

* * * * *